Figure 1:
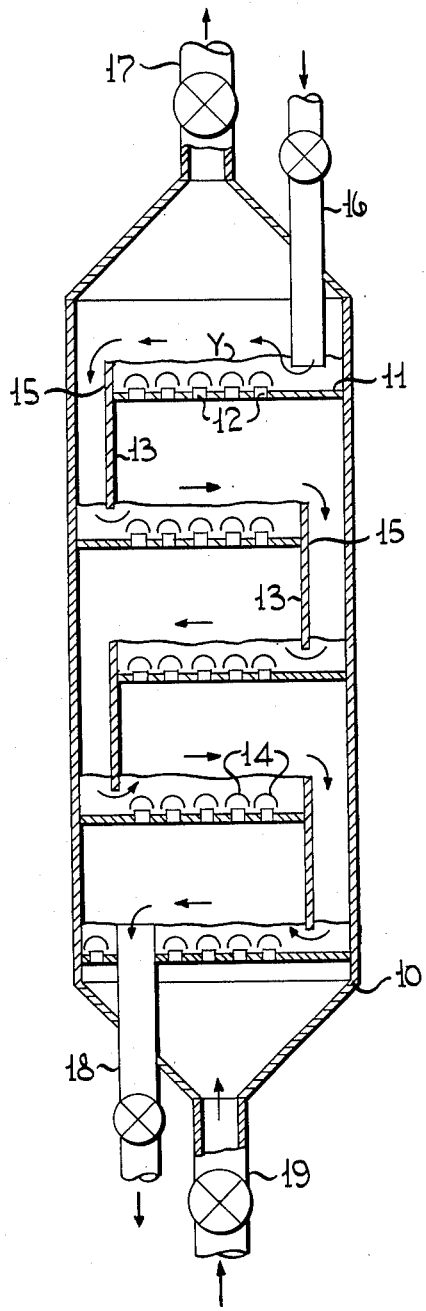

May 26, 1953

R. J. FRITZ 2,639,973

METHOD OF AND APPARATUS FOR IMPROVING GAS
DISTRIBUTION IN BUBBLE-CAP TOWER
OPERATING ON FLUIDIZED SOLIDS

Filed Dec. 16, 1950

2 Sheets-Sheet 1

Robert J. Fritz   Inventor

By W. O. T Heilman  Attorney

Patented May 26, 1953

2,639,973

UNITED STATES PATENT OFFICE 2,639,973

METHOD OF AND APPARATUS FOR IMPROVING GAS DISTRIBUTION IN BUBBLE-CAP TOWER OPERATING ON FLUIDIZED SOLIDS

Robert J. Fritz, Baton Rouge, La., assignor to Standard Oil Development Company, a corporation of Delaware Application December 16, 1950, Serial No. 201,076

5 Claims. (Cl. 23—1)

1

The present invention is concerned with an improved method and apparatus for contacting vapors with fluidized, finely divided solid particles. The invention is more particularly concerned with a method and apparatus for contacting fluidized solid particles and vapors in a series of superimposed contact chambers or zones in a contacting vessel, wherein the fluidized solid particles are passed downwardly in countercurrent relationship to the ascending vapors or gases. In accordance with the present invention, vapors or gases are passed through a reaction zone or vessel in a direction countercurrent to the flow of finely divided fluidized contacting materials. The vapors are passed upwardly through the reaction zone and the finely divided solid particles are passed downwardly under conditions wherein the velocity of upblowing vapor or gas is so adjusted that the solid particles are fluidized and simulate a liquid. In accordance with the present invention, the upflowing gas is brought in close contact with the dense solids near the downcomer. In accordance with the present invention gas distribution in a bubble cap plate tower or its equivalent, operating on fluidized solids is markedly improved by the use of jets extending up into the partial deaerated or dense zone which exists near the downcomers. The jets of tower gas are utilized to fluff up the solids thereby reducing the density gradient across the tray, minimizing the gas sweepage over the tray and effecting marked efficiency in the operation of the tray.

It is well known in the art to conduct various reactions employing fluidized solid particles wherein gases and vapors are contacted with the same. In these reactions, the solid particles are maintained in a fluidized state by the velocity of upflowing gases which for example is normally in the range of from about 0.5 to 3 ft. per second. The size of the catalyst particles is usually below about 200 microns. Usually, at least 50% of the catalyst has a micron size in the range from about 20–80. In fluidized solid operations of this character, it is also known to use bubble cap trays wherein the upflowing gases move from one zone to another through bubble caps or their equivalent into a dense bed of fluidized solids disposed immediately above the respective trays. These solids flow across the tray and across a weir into a downcomer and pass into the zone below. The height of the dense bed or phase above the respective tray is determined by the weir height. While operations of this sort have been entirely satisfactory, one disadvantage is

2 that in a bubble-cap tower employing fluidized solids it has been found that the solids issuing from the downcomer form a dense and partially deaerated zone on the tray close to the downcomer. This dense zone due to its high viscosity, gives rise to an hydraulic gradient with the net result that the gas passing through the caps at the downcomer end of the tray is reduced and the gas or vapor rate through the weir end of the tray is increased. This phenomenon is observed in liquid-vapor towers but there is at least one major difference. The dense solids tend to sweep the gas toward the weir end of the tray further decreasing the uniformity of gas contacting.

In accordance with the present invention, gas distribution in a bubble-cap tower operating on fluidized solids can be markedly improved by the use of jets extending up into the partially deaerated or dense zone which is evident near the downcomers. The jets of tower gas are used to fluff up the solids thereby reducing the density gradient across the tray and minimizing the gas sweepage over the tray.

The invention and its objects may be more fully understood from the following description when read in conjunction with the accompanying drawings.

Figure 3:
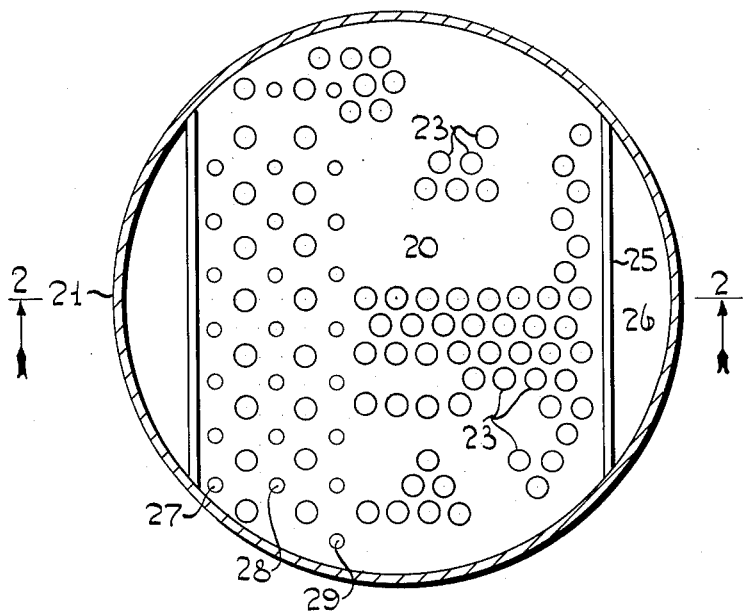
Figure 2:
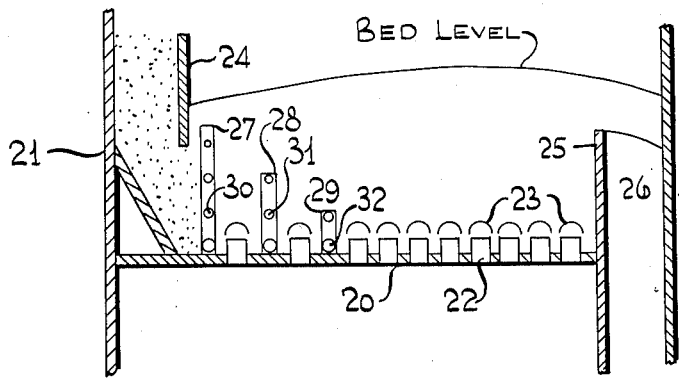

Figure 1 is a semi-diagrammatic illustration showing a typical fluidized solids contacting vessel in vertical section. Figure 2 illustrates the present invention, while Figure 3 is a top view of the bubble-cap plate of the present invention.

Referring specifically to Figure 1, the numeral 10 designates a fluidized solids bubble tray column, contacting vessel. The vessel 10 is conventionally provided with a series of vertically spaced, transverse, perforated plate elements 11, forming a vertical series of superimposed, contact chambers or zones. These chambers or zones are in communication one with another by way of the passageways 12 formed by the plate perforations, and downcomers 13 disposed at alternate sides of the vessel from plate to plate. The downcomers extend from the surface of one plate downwardly into vertically spaced relation to the surface of the plate next below. As shown in Figure 1, the passageways 12 through the plate are each provided with bubble cap elements 14. In addition, each plate 11 is provided with a weir member 15, at the entrance to the downcomer 13, extending upwardly from the plate surface to a level above the lower end of the downcomer from the plate next above. The vessel is also provided with an inlet pipe 16 for fluidized solid material extending into the upper end of the vessel, and terminating in spaced relation to the uppermost plate 11, below the upper end of the weir 15 for that plate. An outlet from the vessel for gaseous materials is provided as by conduit 17. As the lower end of the vessel is an outlet 18 for finely divided solid materials, and an inlet 19 for gaseous materials to be passed through the vessel.

to facilitate aeration of the solids and more even gas velocities across the tray are obtained. Also, caps can be restricted at the center and weir portions of the tray forcing more gas through the caps at the downcomers and this expedient results in more uniform gas distribution and lower density and hydraulic gradients across the tray as shown below.

|  | Uniform Caps | | | Graduated Restrictions in Caps | | |
|---|---|---|---|---|---|---|
|  | Down-comer | Center | Weir | Down-comer | Center | Weir |
| Density, lb./C. F | 20.4 | 15.3 | 6.2 | 9.7 | 9.1 | 14.7 |
| CapΔP, in. H₂O | 0.1 | 0.8 | 1.8 | 1.8 | 1.7 | 1.1 |
| Avg. Hydraulic Grad | | +.40 | | | −0.15 | |
| Gas Vel. Thru. Caps, ft./sec | 0.6 | 1.5 | 1.9 | 2.0 | 1.4 | 0.8 |
| Gas Vel. Thru. Bed, ft./sec | 0.4 | 0.9 | 3.2 | 2.0 | 2.4 | 0.9 |

Referring specifically to Figure 2, bubble-cap plate 20 is shown disposed in tower 21. Bubble-cap plate 20 contains chimneys 22, containing disposed thereon bubble-caps 23. Fluidized solids from the zone above flow downwardly through downcomer 24 onto plate 20. A dense phase of fluidized solids is maintained on the top of zone 20 determined by the height of weir 25. Fluidized solids flow from plate 20 over the top of weir 25 into downcomer 26 and pass to the zone below. In accordance with the present invention upflowing gas is brought in close contact with the dense solids near downcomer 24. This is secured by employing tubes 27, 28 and 29. These tubes contain graduated holes 30, 31 and 32. Thus, in accordance with the present invention fluidized solids flow downwardly through downcomer 24 and tend to form a rather dense non-aerated area on plate 20 near downcomer 24. Gases or vapors flow upwardly through the bubble-caps 22 into the dense phase of fluidized solids maintained on the top of plate 20. In accordance with the present invention gases also flow upwardly through tubes 27, 28 and 29 and aerate the solids flowing from the zone above. Thus, the formation of a rather dense phase of non-aerated solids is prevented in the zone adjacent the downcomer. In accordance with the present invention the series of tubes adjacent the downcomer extend to the highest point in the dense phase and above the lip of the downcomer. The height of this tube is below the total height of the fluidized bed on top of plate 20. The intermediate series of tubes is somewhat lower than the series of tubes nearest the downcomer. In a similar manner the series of tubes furthest away from the downcomer are lowest and merely extend above the bell-caps themselves. In accordance with the present invention the holes in the respective tubes have a smaller diameter as they approach the top of the tube thus, permitting a uniform flow of vapors from the tube throughout the tube length.

Figure 3 merely illustrates a desirable view of the present invention as illustrated by Figure 2.

The present invention is broadly concerned with increasing the efficiency of fluidized solids contacting zones wherein bubble-cap trays or their equivalent are used. The improvement is secured by bringing the gas in close contact with the dense solids near the downcomer. By installing tubes with graduated holes near the downcomer in a bubble-cap tower, more efficient gas distribution is realized; less gas is necessary The above data were taken at 875 lb./min./ft. of tower width of an average gas velocity of 1.5 ft./sec. As the solids rate is changed the restrictions either over-correct or under-correct for the sweeping action of the solids as may be seen from the attached figure. At low solids rates the downcomer density is low, indicating a high gas velocity in the region of the downcomer. However, at high solids rates, the downcomer density is high and the gas velocity is low. Thus the type of restrictions used give uniform gas distribution only over a narrow range of solids rate.

However, with the rather deep bed levels required for adsorption, the gas from the caps cannot effectively aerate the catalyst issuing from the downcomer. The gas leaving the bubble caps is effective in aerating catalyst only at relatively short distances from the caps.

In accordance with the present invention tubes are installed near the downcomer end of the tray which extend through the tray in order to facilitate aeration of the solids. By this method the aeration can be done with a smaller amount of gas and more even gas velocities across the tray can be obtained over a wider range of solids throughout.

Having described the invention it is claimed:

1. In an operation wherein downflowing fluidized solids countercurrently contact upflowing gases in a series of superimposed contact chambers in a contacting vessel, wherein said chambers are separated by means of bubble cap plates through which upflowing vapors pass, wherein a dense phase of fluidized solids flow across the top of each plate and wherein said fluidized solids pass from the dense phase of one plate to the dense phase of a lower plate by means of a downcomer, the improvement which comprises passing upflowing vapors from a lower chamber into the dense phase of an upper plate at a plurality of spaced distances above the bubble caps of said upper plate in the vicinity of the downcomer from a chamber above said upper plate.

2. Process as defined by claim 1 wherein said spaced distances above the bubble caps of said upper plate decrease in the direction of flow of said fluidized solids across said plate.

3. Improved apparatus for contacting fluidized solids with upflowing vapors which comprises a series of superimposed contact chambers in a contacting vessel, said chambers being separated by means of bubble cap plates, said plates having overflow weirs extending above the height of the bubble caps, said plates also having downcomers and being further characterized by containing tubular elements comprising passageways from below said plate to a plurality of points above said bubble-caps and below the top of said weir.

4. Apparatus as defined by claim 3 wherein said tubular elements contain openings of gradually decreasing size as the element extends above said plate.

5. Apparatus as defined by claim 3 wherein said tubular elements extend above said plate to a lesser extent as they approach said weir.

ROBERT J. FRITZ.

References Cited in the file of this patent

UNITED STATES PATENTS

| Number | Name | Date |
| --- | --- | --- |
| 2,494,337 | Hemminger | Jan. 10, 1950 |